(12) United States Patent
Bao et al.

(10) Patent No.: US 9,330,420 B2
(45) Date of Patent: May 3, 2016

(54) USING CROWDSOURCING TO IMPROVE SENTIMENT ANALYTICS

(71) Applicant: INTERNATIONAL BUSINESS MACHINES CORPORATION, Armonk, NY (US)

(72) Inventors: Sheng H. Bao, Beijing (CN); Yu Deng, Yorktown Heights, NY (US); Hong L. Guo, Beijing (CN); Qi Hu, Beijing (CN); Jim A. Laredo, Katonah, NY (US); Roman Vaculin, Bronxville, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/741,567

(22) Filed: Jan. 15, 2013

(65) Prior Publication Data

US 2014/0201749 A1 Jul. 17, 2014

(51) Int. Cl.
*G06F 17/30* (2006.01)
*G06F 7/00* (2006.01)
*G06Q 50/00* (2012.01)

(52) U.S. Cl.
CPC ............... *G06Q 50/01* (2013.01); *G06F 17/30* (2013.01)

(58) Field of Classification Search
CPC .................... G06F 17/30598; G06F 17/30386; G06F 17/28; G06F 17/20; G06F 17/30864; G06F 17/30867; G06F 17/30997; G06F 17/30017; G06F 17/30554; G06F 9/4881; G06F 9/4843; G06F 9/52; G06F 9/3851; G06F 9/4887; G06Q 10/06311; G06Q 10/10; G06Q 30/0208
USPC .......................................... 707/754; 718/102
See application file for complete search history.

(56) References Cited

U.S. PATENT DOCUMENTS

| | | | |
|---|---|---|---|
| 8,600,796 B1 * | 12/2013 | Sterne et al. .................. 705/7.33 |
| 2009/0287532 A1 * | 11/2009 | Cohen .................... G06Q 10/06 705/7.14 |
| 2011/0295722 A1 | 12/2011 | Reisman | |
| 2011/0307495 A1 * | 12/2011 | Shoshan ............. G06F 17/2854 707/748 |
| 2012/0123948 A1 | 5/2012 | Fefer et al. | |
| 2013/0091141 A1 * | 4/2013 | Mishra .................... G06Q 50/01 707/741 |
| 2013/0197954 A1 * | 8/2013 | Yankelevich .......... G06Q 30/02 705/7.13 |
| 2013/0325550 A1 * | 12/2013 | Varghese ............... G06Q 30/02 705/7.31 |
| 2014/0201251 A1 | 7/2014 | Bao et al. | |

OTHER PUBLICATIONS

"Transform Social Interactions into Business Results," Get Satisfaction, Inc., copyright 2012, 3 pages. Accessed Jan. 7, 2013, https://getsatisfaction.com/.

(Continued)

*Primary Examiner* — Usmaan Saeed
*Assistant Examiner* — Raquel Perez-Arroyo
(74) *Attorney, Agent, or Firm* — Yee & Associates, P.C.; Louis Percello (57) ABSTRACT

A method and computer for managing analysis of sentiment is disclosed. A computer retrieves data used to perform the analysis of sentiment. The computer analyzes the data and the analysis of sentiment to determine if a gap exists requiring further processing to improve the analysis of sentiment. Responsive to a determination that the gap exists requiring further processing to improve the analysis of sentiment, the computer generates a task to address the gap. The computer then uses crowdsourcing to submit the generated task for processing.

21 Claims, 7 Drawing Sheets

(56) References Cited

OTHER PUBLICATIONS

Bao et al., "Mining Latent Associations of Objects Using a Typed Mixture Model—A Case Study on Expert/Expertise Mining," Proceedings of the Sixth International Conference on Data Mining (ICDM '06), Dec. 2006, pp. 803-807.

Office action regarding U.S. Appl. No. 13/969,531, dated Aug. 29, 2014, 32 pages.

* cited by examiner

USING CROWDSOURCING TO IMPROVE SENTIMENT ANALYTICS

BACKGROUND OF THE INVENTION

1. Field of the Invention

The disclosure relates generally to using data processing systems for sentiment analytics and, in particular, to managing improvements for sentiment analytics. Still more particularly, the present disclosure relates to using crowdsourcing to perform specified tasks associated with improving the effectiveness of sentiment analysis.

2. Description of the Related Art

Social media and Web 2.0 Technologies® have significantly enhanced interactive information sharing and collaboration over the Internet. Social networking sites, such as Facebook® and Twitter provide collaboration tools which allow users to interact with each other by exchanging messages with other computer users. Typical collaboration tools include tools for chatting, texting, instant messaging, multimedia messaging, emailing, conferencing, tweeting, and commenting.

Through the use of collaboration tools users sometimes express sentiments about features and aspects of entities. An entity is something that exists by itself, although it need not be of material existence. An entity is defined as a particular and discrete unit. For example, an entity may be a person, an organization, a thing, an abstract idea, a problem, a solution, and a particular type of activity. The entities discussed may be particularly named persons, places, or things and sometimes may include unnamed entities. An aspect of an entity is an appearance of the entity to the eye or mind. Some aspects of entities include physical appearances such as those based on sight, touch, smell, and other senses. Other aspects of entities include descriptions of metaphysical concepts, such as an aspect of a particular philosophy. More particularly, entities may have aspects that contrast one entity from other entities.

Sentiment of an aspect of an entity is a subjective expression of a positive, negative or neutral opinion of the aspect of the entity. For example, sentiment of an aspect of an entity may be defined on a scale such as between −5 to +5 with −5 being the most negative, +5 the most positive, and 0 as neutral.

Sentiment analytics refers to the application of natural language processing, computational linguistics, and text analytics to identify and extract subjective information in source materials. Using sentiment analytics, computer programs can mine source material to derive user sentiment about various aspects of entities. However, gaps may exist wherein the sentiment analysis of the source materials is determined to be insufficient to derive sentiment for some aspects of some entities.

Crowdsourcing is a process for performing certain kinds of tasks. In a crowdsourcing effort or procedure, a large group of organizations, individuals and other entities that desire to provide pertinent services, such as a specific community of providers or the general public, are invited to participate in a task that is presented by a task requester. At present, a crowdsourcing platform may serve as a broker or intermediary between the task requester and providers who are interested in undertaking or participating in task performance. Crowdsourcing platforms generally allow requesters to publish or broadcast their challenges and tasks, and further allow participating providers that are successful in completing the task to receive specified monetary rewards or other incentives. Innocentive®, TopCoder®, and MechanicalTurk® are examples of presently available platforms.

Currently however, there is no system or process available for creating and submitting crowdsourced tasks to address computer identified gaps in sentiment analysis of source materials determined to be insufficient to derive sentiment for aspects of entities.

Therefore, it would be advantageous to have a method, data processing system, and computer program product that takes into account at least some of the issues discussed above, as well as possibly other issues.

In one illustrative embodiment, a method, data processing system, and computer program product for managing analysis of sentiment is disclosed. A data processing system analyzes the data and the analysis of sentiment to determine if a gap exists requiring further processing to improve the analysis of sentiment. Responsive to a determination that the gap exists requiring further processing to improve the analysis of sentiment, the data processing system generates a task to address the gap. The data processing system then uses crowdsourcing to submit the generated task for processing.

DETAILED DESCRIPTION OF THE PREFERRED EMBODIMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account that existing web based applications are available for sharing sentiment information of users. Web based applications typically run on a web server. These web based applications communicate with web browsers and other applications by generating documents such as web pages and sending the documents and other data over a network. The generated web pages are typically displayed on a display screen by a web browser running on a computing device. For example, a web based application for a crowdsourcing platform may generate a web page for a user account for an owner of the user account. In this example, the owner of the user account may make selections for performing and managing tasks in the crowdsourcing platform. For example, responsive to accepting a task, the owner of the user account may provide answers to questions while performing the task, such as by providing sentiments related to aspects of entities.

As used herein, the term "computing device" means a hardware device with a processor unit and a capability to display information on a display device and may also include the capability to emit audio on a speaker. For example, the computing device may be a computer, a television with a processor unit, a smart phone, and any other suitable device.

The illustrative embodiments also recognize and take into account that existing web based applications are available for sharing sentiments about aspects of entities with users of social networking web sites and other collaboration tools. For example, when a user is using a web based application of a social network, the web based application may allow the user to enter and share sentiments about topics of interest. Through the expression of sentiment about the topics of interest the user may provide sentiments about particular aspects of entities associated with the topic of interests. For example, the user may provide a positive or negative opinion about a specific aspect of a specific entity.

The illustrative embodiments further recognize and take into account that existing sentiment analytics tools for performing natural language processing, computational linguistics, and text analytics are available to identify and extract subjective information in source materials. These sentiment analytics tools may be used to identify user sentiment about aspects of entities from information entered by users into social networks and collaboration tools.

Thus, the different illustrative embodiments provide a method, apparatus, and computer program product to manage analysis of sentiment. For example, the different illustrative embodiments may use a process for managing analysis of sentiment. For example, a sentiment analytics management system may retrieve data used to perform an analysis of sentiment for aspects of an entity corresponding to an activity. The sentiment analytics management system may analyze the data and the analysis of sentiment to determine if a gap exists requiring further processing to improve the analysis of sentiment. In this example, the gap corresponds to a topic about a particular aspect of the entity. The sentiment analytics management system may generate a task to address the gap based on a template corresponding to a type of gap of the gap. The sentiment analytics management system may also use crowdsourcing to submit the generated task for processing. After submitting the task for processing, the sentiment analytics management system may receive a result of the processing of the task. Responsive to receiving a result of the processing of the task, the sentiment analytics management system may then re-calculate the analysis of sentiment based on the result.

Figure 1:
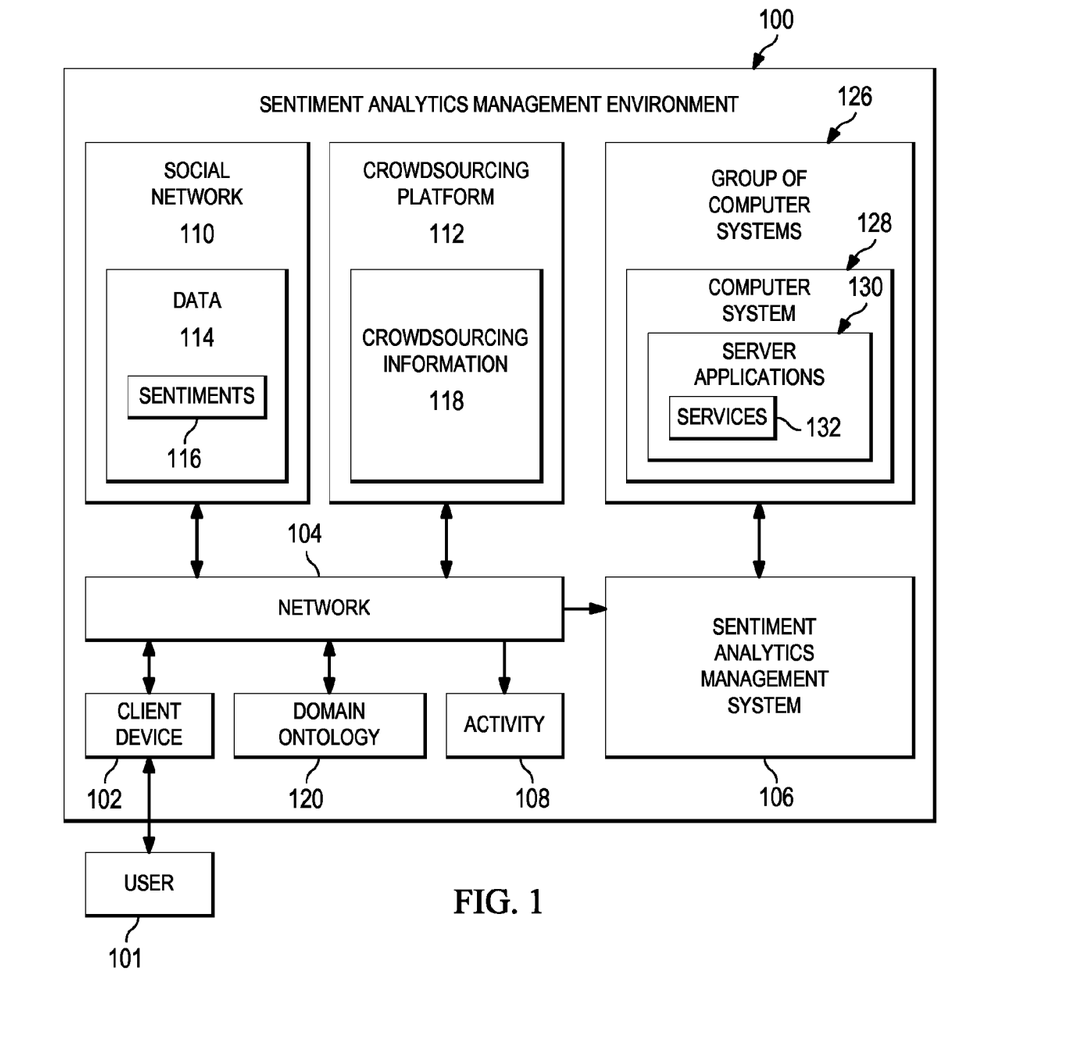
FIG. 1 is an illustration of a sentiment analytics management environment for managing analysis of sentiment in accordance with an illustrative embodiment.

With reference now to the figures and, in particular, with reference to FIG. 1, an illustration of a sentiment analytics management environment for managing analysis of sentiment is depicted in accordance with an illustrative embodiment. In this illustrative example, sentiment analytics management environment 100 is depicted in block diagram form.

In these illustrative examples, users, such as user 101, may use client applications running on computing devices such as client device 102 within sentiment analytics management environment 100. Client applications running on client device 102 may take various forms. For example, client applications may include at least one of a web browser, a sentiment analytics management application, a database application, a smart-phone application, and other suitable types of applications for sentiment analytics management environment 100. In these illustrative examples, a web browser may display information on a display screen of client device 102 and may also present information to user 101 by using a speaker to emit audio.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, client device 102 communicates with sentiment analytics management system 106 over network 104. In these illustrative examples, user 101 may send activity 108 to sentiment analytics management system 106 for processing. Activity 108 may be a development project, such as construction of cinemas, roads, utilities, government facilities, housing, commercial products, and any other type of activity for which sentiment analysis is useful.

As also depicted, sentiment analytics management system 106 and client device 102 may communicate with social network 110 and crowdsourcing platform 112 over network 104. In these illustrative examples, social network 110 may be a web based application having data 114 entered by users, such as user 101. As depicted, data 114 may comprise sentiments 116 about aspects of entities associated with activities such as activity 108. For example, one or more members of social network 110 may have previously entered sentiments 116 for one or more aspects of entities corresponding to activity 108. Social network 110 may provide services to search for, browse, enter, and modify data 114.

In these illustrative examples, crowdsourcing platform 112 serves as a broker or intermediary between task requesters and providers who are interested in undertaking or participating in performance of tasks associated with improving sentiment analytics for activities. As depicted, sentiment analytics management system 106 generates tasks and makes requests to providers to process the tasks via crowdsourcing platform 112. In these illustrative examples, crowdsourcing platform 112 is used by sentiment analytics management system 106 in a process to improve sentiment analysis for activity 108. For example, sentiment analytics management system 106 may use crowdsourcing platform 112 to publish a task associated with resolving an issue with sentiment analysis of a particular aspect of an entity corresponding to activity 108. In this example, providers may perform the task and provide crowdsourcing information 118. For example, crowdsourcing information 118 may include responses to surveys for additional sentiment and other responses to questions associated with resolving the issue with the sentiment analysis.

In these illustrative examples, domain ontology 120 is located within sentiment analytics management environment 100. Domain ontology 120 may include one or more aspects of one or more entities associated with activity 108, one or more other activities related to activity 108, prioritization information associated with sentiment for each aspect and related activity, and other information suitable for use in identifying tasks associated with activity 108. For example, domain ontology 120 may be for a government domain, commercial domain and other suitable domains. In this example domain ontology 120 may include a description of targeted activities, such as cinema construction, government service construction, and other suitable activities. In these illustrative examples, domain ontology 120 may include descriptions of possible issues related to the targeted activities such as traffic issues, safety issues, environmental issues, service issues, and other suitable issues. Domain ontology 120 may also include descriptions of aspects of entities related to the activity, such as aspects of a location, aspects of facilities, aspect of organizations, and other suitable aspects of entities. Domain ontology 120 may further include characteristics of a targeted audience, such as interest, profession, age, gender, and other suitable characteristics of targeted audiences.

As depicted, sentiment analytics management system 106 may use domain ontology 120 to identify tasks associated with improving sentiment analysis for activity 108. For example, subsequent to analyzing sentiments 116 and domain ontology 120 sentiment analytics management system 106 may identify an issue associated with sentiments 116 about aspects of entities in domain ontology 120. In this example, sentiment analytics management system 106 may generate a task associated with resolving the issue and send the task to crowdsourcing platform 112 for processing. As another example, subsequent to analyzing sentiments 116 and domain ontology 120 sentiment analytics management system 106 may identify an issue associated with information in domain ontology 120. In this example, a definition of an entity and/or aspect of an entity in domain ontology 120 may require refinement. As still another example, more training data may be required to improve the ability of sentiment analytics management system 106 to analyze data 114 for identifying sentiments 116.

In these illustrative examples, computer system 128 within group of computer systems 126 is one or more computers. Also, as used herein, "group of" when used with reference to items means one or more items. For example, group of computer systems 126 is one or more computer systems. When computer system 128 is more than one computer, the computer system may take the form of a computer cluster, group of computer systems 126, or other configurations of computer systems configured to run server applications 130.

Sentiment analytics management system 106 uses sever applications 130 located on computer system 128 in group of computer systems 126. A computer system is one or more computers in these illustrative examples. Server applications 130 may be any applications configured to process communications to provide services 132. Server applications 130 may be, for example, at least one of a database server, a file transfer protocol (FTP) server, a web server, a mail server, and/or other suitable types of applications. Services 132 may include, for example, at least one of retrieving a file, retrieving a webpage, retrieving information, writing information, downloading a program, and/or other suitable types of access.

Sentiment analytics management system 106 may be implemented using hardware, software, or a combination of the two. In these illustrative examples, sentiment analytics management system 106 is configured to manage sentiment analysis using group of computer systems 126. In these illustrative examples, sentiment analytics management system 106 is configured to use services 132 of server applications 130. For example, sentiment analytics management system 106 may use a service in services 132 to perform sentiment analysis on data 114 and domain ontology 120 for activity 108. As another example, sentiment analytics management system 106 may use another service in services 132 to generate and publish tasks, such as tasks identified by sentiment analytics management system 106 to improve the sentiment analysis. In these illustrative examples, sentiment analytics management system 106 may be implemented as a server, such as a web server, that is used by users for managing sentiment analysis of activities.

The illustration of sentiment analytics management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional social networks, in addition to social network 110, may be present within sentiment analytics management environment 100. Also, although sentiment analytics management system 106 is shown as a block separate from group of computer systems 126, sentiment analytics management system 106 may be implemented in computer system 128. In other examples, sentiment analytics management system 106 may be implemented in one or more computer systems in group of computer systems 126.

Further, although social network 110, crowdsourcing platform 112, and sentiment analytics management system 106 are shown in the block for sentiment analytics management environment 100 they may be remote from each other, such as by being in different locations. For example, social network 110 may be located in a first physical location and crowdsourcing platform 112 may be located in a second physical location different from the first physical location.

Figure 2:
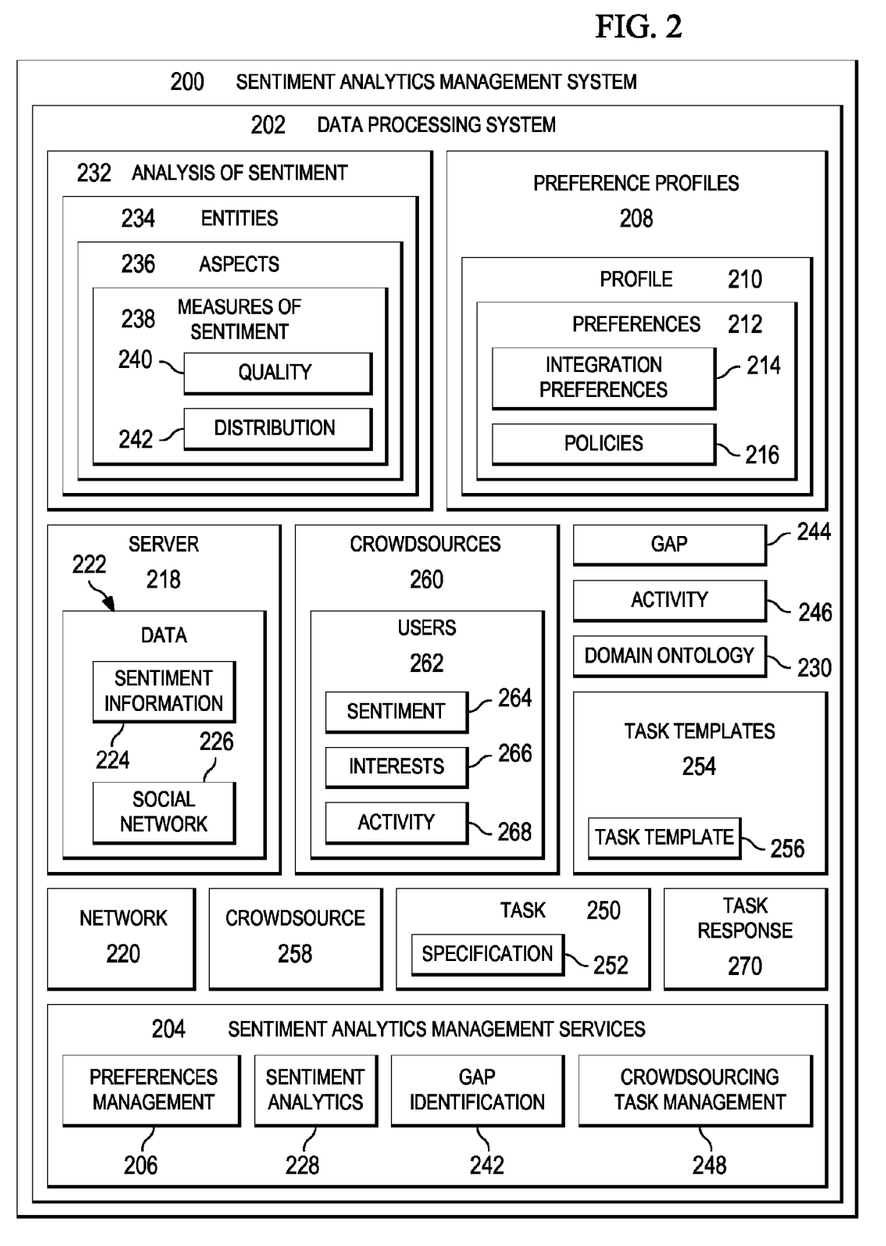
FIG. 2 is a block diagram of components involved in managing analysis of sentiment in a data processing system in a sentiment analytics management system in accordance with an illustrative embodiment.

Turning next to FIG. 2, a block diagram of components involved in managing analysis of sentiment in a data processing system in a sentiment analytics management system is depicted in accordance with an illustrative embodiment. Sentiment analytics management system 200 is an example of one implementation of sentiment analytics management system 106 in sentiment analytics management environment 100 in FIG. 1.

In this illustrative example, data processing system 202 is present in sentiment analytics management system 200. Data processing system 202 may be any combination of hardware components implementing sentiment analytics management system 200. Data processing system 202 comprises sentiment analytics management services 204. In these illustrative examples, sentiment analytics management services 204 comprise a number of services that manage analysis of sentiment. Preferences management 206 is a service included in sentiment analytics management services 204 that manages user profiles of users of sentiment analytics management system 200.

As depicted, preference profiles 208 include one or more profiles in sentiment analytics management system 200 of users of sentiment analytics management system 200. In these illustrative examples, profile 210 is profile of a user located in preference profiles 208. Each profile in preference profiles 208 is an account or other record of information for users of sentiment analytics management system 200. In these illustrated examples, profiles, such as profile 210, include preferences 212 of users of sentiment analytics management system 200. Preferences 212 of users may be selected by a user, an administrator, and by a rule using default preferences. Preferences 212 include integration preferences 214 for using social networks and crowdsourcing platforms. Preferences 212 may also include polices 216 for determining if further processing is required to improve an analysis of sentiment information and for determining who to send tasks to address gaps in sentiment analysis too. In these illustrative examples, policies 216 may specify aspects of entities for which sentiment information must meet particular thresholds. The policies may include a threshold for a quality of sentiment information about an aspect of an entity, threshold for a distribution of sentiment information about an aspect of an entity, an absence of sentiment information about an aspect of an entity, and other suitable thresholds for determining if sentiment information is sufficient for an analysis of sentiment.

In these illustrative examples, integration preferences 214 in profile 210 include an identification of one or more servers, such as server 218. Integration preferences 214 may also include an identification of information for communicating with server 218. For example, the information for communicating with server 218 may, include identification of networking protocols used by server 218 over a network, such as network 220, identification of networking addresses of server 218 in network 220, identification of user names and passwords for gaining access to data 222 in server 218, and any other suitable information for communicating with server 218 in sentiment analytics management system 200.

In these illustrative examples, server 218 may host one or more web sites, such as social network 110 and crowdsourcing platform 112 in FIG. 1. As depicted, server 218 may include data 222, such as sentiment information 224 and social network 226. In these illustrative examples, sentiment information 224 and social network 226 may be used to perform an analysis of sentiment. Sentiment information 224 is an example of sentiments 116 in FIG. 1. In these illustrative examples, sentiment information 224 may comprise one or more sentiments about aspects of entities. For example, the sentiments in sentiment information 224 may comprise subjective expressions of positive, negative, and neutral opinions about the aspects of the entities. Social network 226 is an example of a social network of a user of server 218, such as user 101 in FIG. 1 retrieved from data 114 in FIG. 1. In these illustrative examples, social network 226 may include identification of relationships, memberships, known instant messaging identifiers, known email identifiers, known phone numbers, corporate associations, legal associations and any other suitable social networking information of a user of server 218 in sentiment analytics management system 200.

Sentiment analytics 228 is a service included in sentiment analytics management services 204 for generating an analysis of sentiment from sentiment information 224. In these illustrative examples, sentiment analytics 228 retrieves aspects 236 of entities 234 from domain ontology 230 to generate analysis of sentiment 232. Domain ontology 230 is an example of domain ontology 120 in FIG. 1. As depicted, sentiment analytics 228 determines measures of sentiment 238 from data 222. Measures of sentiment 238 may include quality 240 of sentiment information 224, distribution 242 of sentiment information 224, and any other suitable measure of sentiment in sentiment analytics management system 200. In these illustrative examples, quality 240 of sentiment information 224 may include one or more of a count of a number of users expressing a same sentiment, a confidence level that sentiment expressed is meaningful, a number of members of a group agreeing with a sentiment, a weighted value indicating the strength of each sentiment, an association of the sentiment information with users meeting characteristics of a targeted audience, and any other suitable quality for sentiment information about aspects of entities.

Gap identification 243 is a service included in sentiment analytics management services 204 for identifying gaps, such as gap 244 in which further processing is required to improve analysis of sentiment 232. In these illustrative examples, gap identification 243 uses policies 216 to identify gap 244 based on measures of sentiment not meeting one or more thresholds in polices 216.

Crowdsourcing task management 248 is a service included in sentiment analytics management services 204 for managing tasks to improve analysis of sentiment 232. As depicted, crowdsourcing task management 248 generates task 250 from a task template matching the type of gap of gap 244, such as task template 256 in task templates 254. In these illustrative examples, task 250 comprises specification 252 for performing task 250 generated by crowdsourcing task management 248. Specification 252 may comprise a description of activity 246, domain ontology 230, a description of gap 244, a description of task 250, sentiment information 224, measures of sentiment 238 about aspects 236 of entities 234 associated with gap 244, questions for a survey from task template 256, and other suitable instructions for completing task 250 to address gap 244.

In these illustrative examples, crowdsourcing task management 248 identifies one or more entities to perform task 250, such as crowdsource 258. As depicted crowdsourcing task management 248 may identify crowdsource 258 from users 262 based on sentiment 264 interests 266, and activity 268 of each user in users 262. For example, crowdsourcing task management 248 may select crowdsource 258 based on a user in users 262 having sentiment 264, interests 266, and activity 268 that meet a policy in policies 216 for selecting a user to perform a task associated with a gap in analysis of sentiment 232. As depicted, activity 268 is a history of sentiment entered by each user and a history of tasks performed by each user. In these illustrative examples, sentiment 264 is an example of sentiment previously identified by a user of a crowdsourcing platform, such as in previous activity 268. As depicted, interests 266 identify aspects of entities for which a user is an expert. Interests 266 may be determined by crowdsourcing task management 248 based on sentiment 264 and activity 268. Interests 266 may also have been previously selected the user.

Crowdsourcing task management 248 sends generated task 250 to crowdsource 258 and receives task response 270 from crowdsource 258. In these illustrative examples, task response 270 may comprise a result of the processing of task 250, such as additional sentiment information other than sentiment information 224. Subsequent to receiving task response 270, crowdsourcing task management 248 may add the result of the processing of the task returned in task response 270 to data 222. Crowdsourcing task management 248 may also record the response in activity 268. Crowdsourcing task management 248 may further record any sentiment information provided in task response 270 to sentiment 264.

In these illustrative examples, sentiment analytics 228 may then re-calculate analysis of sentiment 232 based in part on the result of the processing of the task returned in task response 270. In these illustrative examples, gap identification 243 may also be used to determine if the result returned in task response 270 has closed gap 244 based on analysis of sentiment 232. For example, gap 244 may be determined to be closed when a policy in policies 216 that identified gap 244 in a previous analysis of sentiment no longer identifies gap 244.

The illustration of sentiment analytics management system 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown sentiment analytics management services 204, may be present within sentiment analytics management system 200. For example, a service in services 132 in FIG. 1 to authorize computing devices such as client device 102 in FIG. 1 may be included in sentiment analytics management system 200. In this example, the authorization of client device 102 may be required by a policy in policies 216 before client device 102 is allowed access to preference profiles 208, activity 246, analysis of sentiment 232, task 250, task response 270, domain ontology 230, task templates 254, and other information in sentiment analytics management system 200.

As another example, a service in sentiment analytics management services 204 in FIG. 2 to retrieve sentiment analytics information, such as domain ontology 230, task templates 254, and training data for sentiment analytics 228, may be included in sentiment analytics management system 200. In this example, the service to retrieve sentiment analytics information may execute on a selected intermittent basis or based on identification of an issue in analysis of sentiment 232. Further in this example, the service to retrieve sentiment analytics information may also execute responsive to a notification from server 218 or crowdsources 260 that a change has occurred in sentiment analytics information that was previously retrieved by sentiment analytics management system 200.

Figure 3:
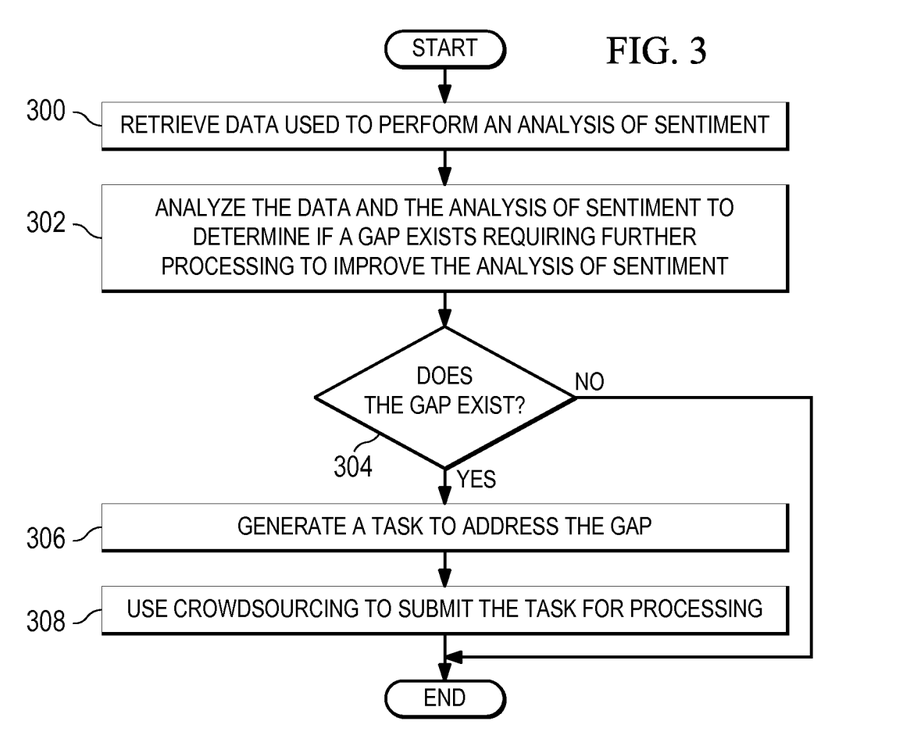
FIG. 3 is a flow chart of a process for managing analysis of sentiment in accordance with an illustrative embodiment.

Turning next to FIG. 3, an illustrative example of a flowchart of a process for managing analysis of sentiment is depicted in accordance with an illustrative embodiment. The steps in FIG. 3 may be implemented in sentiment analytics management system 200 in FIG. 2. In particular, the steps in the process may be implemented in software, hardware, or a combination of the two in sentiment analytics management services 204 in data processing system 202 in FIG. 2.

The process begins by retrieving data used to perform an analysis of sentiment (step 300). In this illustrated process, the data is an example of data 222 in FIG. 2 and the analysis of sentiment is an example of analysis of sentiment 232 in FIG. 2 that is generated by sentiment analytics 228 in FIG. 2.

The process next analyzes the data and the analysis of sentiment to determine if a gap exists requiring further processing to improve the analysis of sentiment (step 302). In this illustrated process, the gap is an example of gap 244 in FIG. 2 that is determined by gap identification 243 in FIG. 2.

As depicted in step 304, if the gap does not exist, the process terminates. Otherwise, if the gap does exist, the process continues by generating a task to address the gap (step 306). In this illustrated process, the task is an example of task 250 in FIG. 2 that is generated by crowd source task management 248 in FIG. 2.

The process then uses crowdsourcing, such as by using a crowdsourcing platform, to submit the generated task for processing (step 308) with the process terminating thereafter. In this illustrated process, the crowdsourcing platform is an example of crowdsourcing platform 112 in FIG. 1.

Figure 4:
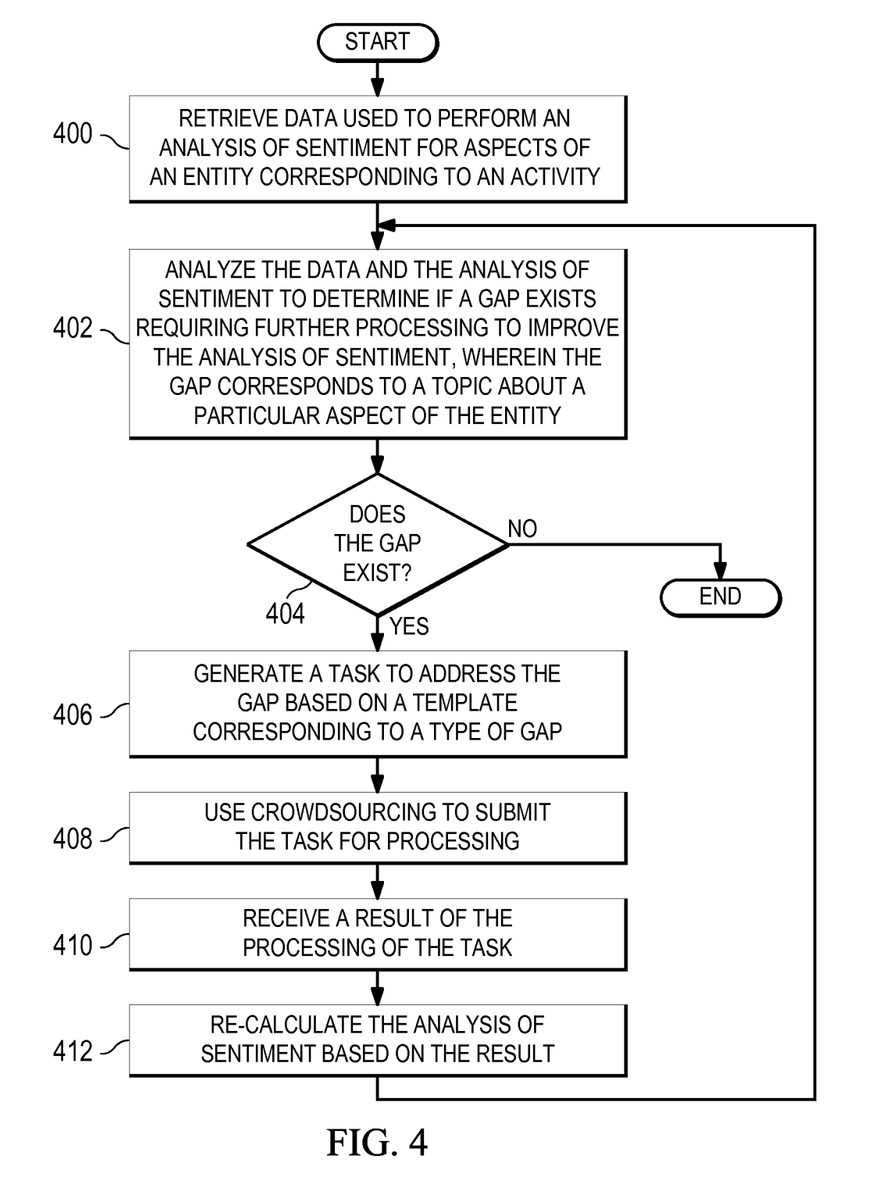
FIG. 4 is a flow chart of a process for managing analysis of sentiment for aspects of an entity corresponding to an activity in accordance with an illustrative embodiment.

Turning next to FIG. 4, an illustrative example of a flowchart of a process for managing analysis of sentiment for aspects of an entity corresponding to an activity is depicted in accordance with an illustrative embodiment. The steps in FIG. 4 may be implemented in sentiment analytics management system 200 in FIG. 2. In particular, the steps in the process may be implemented in software, hardware, or a combination of the two in sentiment analytics management services 204 in data processing system 202 in FIG. 2.

The process begins by retrieving data used to perform an analysis of sentiment for aspects of an entity corresponding to an activity (step 400). In this illustrated process, the data is an example of data 222 in FIG. 2, the analysis of sentiment is an example of analysis of sentiment 232 in FIG. 2, and the aspects of entities are examples of aspects 236 of entities 234 in FIG. 2.

The process next analyzes the data and the analysis of sentiment to determine if a gap exists requiring further processing to improve the analysis of sentiment, wherein the gap corresponds to a topic about a particular aspect of the entity (step 402). In this illustrated process, the gap is an example of gap 244 in FIG. 2 that is determined by gap identification 243 in FIG. 2.

As illustrated in step 404, if the gap does not exist, the process terminates. Otherwise, if the gap does exist, the process continues by generating a task to address the gap based on a template corresponding to a type of gap of the gap (step 406). The process then uses crowdsourcing to submit the generated task for processing (step 408).

After submitting the task for processing, the process receives a result of the processing of the task (step 410). The process then re-calculates the analysis of sentiment based on the result (step 412) with the process continuing to step 402.

Figure 5:
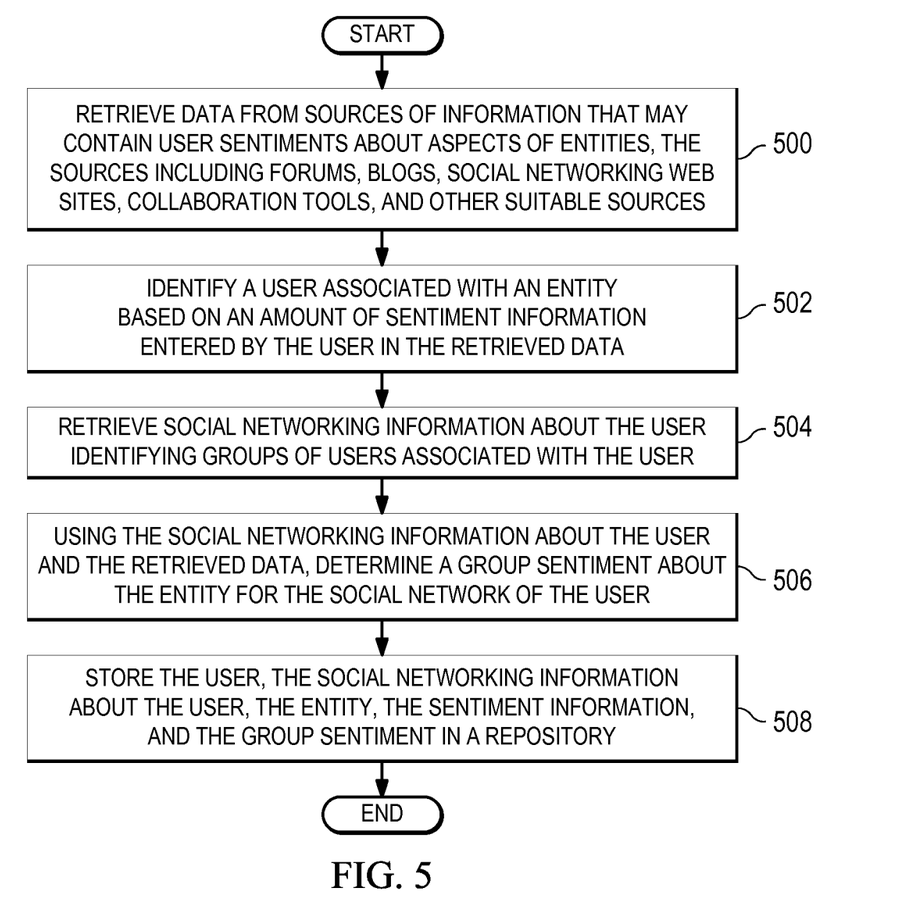
FIG. 5 is a flow chart of a process for identifying user sentiment and group sentiment of social networks for aspects of entities in accordance with an illustrative embodiment.

Turning next to FIG. 5, an illustrative example of a flowchart of a process for identifying user sentiment and group sentiment of social networks for aspects of entities is depicted in accordance with an illustrative embodiment. The steps in FIG. 5 may be implemented in sentiment analytics management system 200 in FIG. 2. In particular, the steps in the process may be implemented in software, hardware, or a combination of the two in sentiment analytics management services 204 in data processing system 202 in FIG. 2.

The process begins by retrieving data from sources of information that may contain user sentiments about aspects of entities, the sources including forums, blogs, social networking web sites, collaboration tools, and other suitable sources (step 500). The process next identifies a user associated with an entity based on an amount of sentiment information entered by the user in the retrieved data (step 502). The process retrieves social networking information about the user identifying groups of users associated with the user (step 504). The process uses the social networking information about the user and the retrieved data, to determine a group sentiment about the entity for the social network of the user (step 506). The process then stores the user, the social networking information about the user, the entity, the sentiment information, and the group sentiment in a repository (step 508) with the process terminating thereafter.

Figure 6:
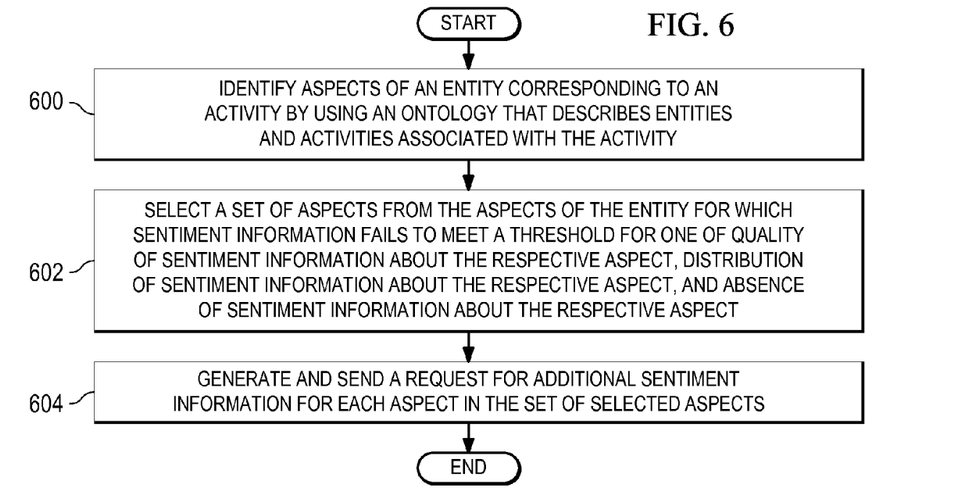
FIG. 6 is a flow chart of a process for generating and sending requests for additional sentiment information for aspects of entities of corresponding to an activity in accordance with an illustrative embodiment.

Turning next to FIG. 6, an illustrative example of a flowchart of a process for generating and sending requests for additional sentiment information for aspects of entities of corresponding to an activity is depicted in accordance with an illustrative embodiment. The steps in FIG. 6 may be implemented in sentiment analytics management system 200 in FIG. 2. In particular, the steps in the process may be implemented in software, hardware, or a combination of the two in sentiment analytics management services 204 in data processing system 202 in FIG. 2.

The process begins by identifying aspects of an entity corresponding to an activity by using an ontology that describes entities and activities associated with the activity (step 600). The process next selects a set of aspects from the aspects of the entity for which sentiment information fails to meet a threshold for one of quality of sentiment information about the respective aspect, distribution of sentiment information about the respective aspect, and absence of sentiment information about the respective aspect (step 602). The process then generates and sends a request for additional sentiment information for each aspect in the set of selected aspects (step 604) with the process terminating thereafter.

Figure 7:
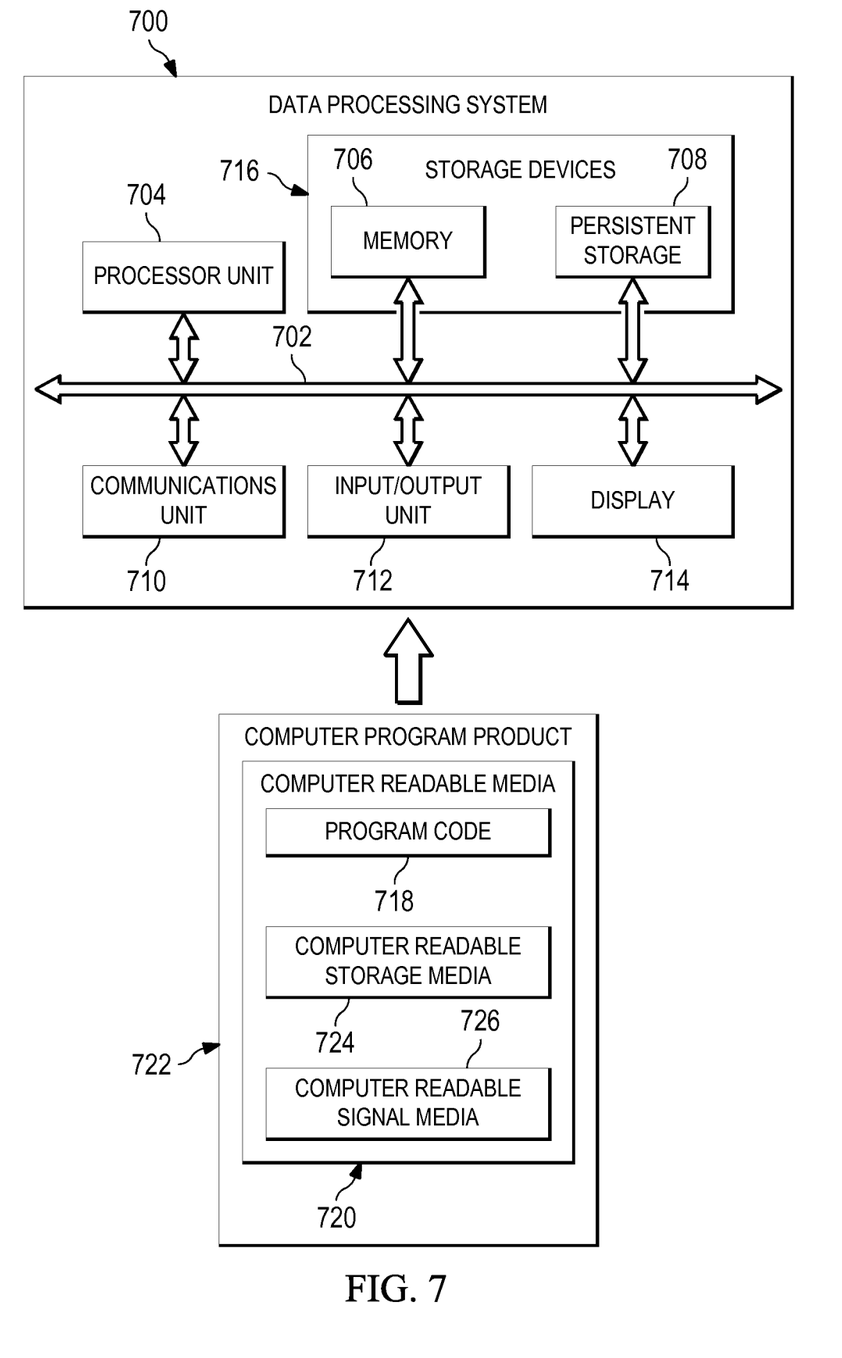
FIG. 7 is an illustration of a data processing system in accordance with an illustrative embodiment.

Turning now to FIG. 7, an illustration of a data processing system is depicted in accordance with an illustrative embodiment. Data processing system 700 is an example of a data processing system that may be used to implement managing authorizations to access personal data in a sentiment analytics management system. Data processing system 700 is also an example of a data processing system that may be used to implement sentiment analytics management system 106 in FIG. 1 and computer system 128 in FIG. 1. More particularly, data processing system 700 may be used to implement data processing system 202 in FIG. 2 and server 218 in FIG. 2. In this illustrative example, data processing system 700 includes communications framework 702, which provides communications between processor unit 704, memory 706, persistent storage 708, communications unit 710, input/output (I/O) unit 712, and display 714. In these examples, communications frame work 704 may be a bus system.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, data processing system, and computer program product for managing analysis of sentiment. In one example, a program runs in a computer system and manages analysis of sentiment by generating and sending tasks to address gaps identified in the analysis of sentiment. In still another example, the program uses crowdsourcing to identify providers who are interested in undertaking or participating in performance of the tasks to address the gaps identified in the analysis of sentiment.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing analysis of sentiment, the method comprising:

retrieving, by a computer, data used to perform the analysis of sentiment;

analyzing, by the computer, the data and the analysis of sentiment using user preferences comprising integration preferences for using social networks and crowdsourcing platforms and policies to determine if a gap in the analysis of sentiment exists requiring further processing to improve the analysis of sentiment, wherein the gap exists in sentiment analysis of source materials determined to be insufficient to derive sentiment for aspects of entities, and wherein gap identification uses the policies to identify the gap based on measures of sentiment not meeting one or more thresholds in the policies;

responsive to the computer analyzing the data and the analysis of sentiment to determine if the gap in the analysis of sentiment exists, determining, by the computer, an amount of positive sentiment in the data and negative sentiment in the data for each topic in a set of topics corresponding to aspects of an entity and selecting, by the computer, a topic from the set of topics corresponding to a particular aspect of the entity for the further processing based on determining that the amount of positive sentiment in the data and negative sentiment in the data for the selected topic fails to meet a threshold amount of positive and negative sentiment for the selected topic to derive sentiment for the particular aspect of the entity;

generating, by the computer, a task using a particular task template, in a set of task templates, matching a type of gap to address the gap in the analysis of sentiment regarding the selected topic that failed to meet the threshold amount of positive and negative sentiment for the selected topic to derive sentiment for the particular aspect of the entity, wherein the task comprises a specification for performing the task comprising a description of activity, a domain ontology, a description of the gap, a description of the task, sentiment information, measures of sentiment about aspects of entities associated with the gap, questions for a survey from the task template, and instructions for completing the task to address the gap; and using, by the computer, crowdsourcing to submit the task for processing to address the gap in the analysis of sentiment regarding the selected topic that failed to meet the threshold amount of positive and negative sentiment for the selected topic to derive sentiment for the particular aspect of the entity, wherein the computer using the crowdsourcing to submit the task for processing further comprises:

identifying, by the computer, users associated with the topic about the particular aspect of the entity based on an amount of sentiment information about the topic in retrieved data from each user;

determining, by the computer, a group sentiment about the topic corresponding to a group of users on a social network; and selecting, by the computer, one or more users within the group of users on the social network to submit the task to based on the determined group sentiment about the topic.

2. The method of claim 1, further comprising:

re-calculating, by the computer, the analysis of sentiment based on receiving a result of the processing of the task to address the gap in the analysis of sentiment regarding the selected topic that failed to meet the threshold amount of positive and negative sentiment for the selected topic to derive sentiment for the particular aspect of the entity; and determining, by the computer, that the received result of the processing of the task closed the gap in the analysis of sentiment regarding the selected topic based on the re-calculating of the analysis of sentiment in response to a policy in the policies that previously identified the gap no longer identifying the gap.

3. The method of claim 1, wherein the analyzing of the sentiment is for the aspects of the entity corresponding to an activity, and wherein the gap in the analysis of sentiment requiring the further processing corresponds to the topic about the particular aspect of the entity.

4. The method of claim 3, further comprising:
identifying, by the computer, the topic about the particular aspect of the entity based on sentiment information about the topic in the data.

5. The method of claim 4, wherein identifying, by the computer, the topic about the particular aspect of the entity based on sentiment information about the topic in the data comprises:
determining, by the computer, a quality of sentiment information in the data for each topic in the set of topics; and
selecting, by the computer, the topic based on the quality of sentiment information for the topic not meeting a threshold for quality of sentiment information.

6. The method of claim 3, further comprising:
identifying, by the computer, the topic about the particular aspect of the entity based on an absence of information about the particular aspect of the entity in the data.

7. The method of claim 1, wherein the task generated by the computer comprises a specification for addressing the gap based on the particular task template corresponding to the type of gap of the gap.

8. The method of claim 3, further comprising:
identifying, by the computer, the aspects of the entity corresponding to the activity by using an ontology that describes entities and activities associated with the activity.

9. A computer system for managing analysis of sentiment, the computer system comprising:
a bus system;
one or more computer readable storage devices connected to the bus system, wherein the one or more computer readable storage devices store program instructions; and
one or more processors connected to the bus system, wherein the one or more processors execute the program instructions to:
retrieve data used to perform the analysis of sentiment;
analyze the data and the analysis of sentiment using user preferences comprising integration preferences for using social networks and crowdsourcing platforms and policies to determine if a gap in the analysis of sentiment exists requiring further processing to improve the analysis of sentiment, wherein the gap exists in sentiment analysis of source materials determined to be insufficient to derive sentiment for aspects of entities, and wherein gap identification uses the policies to identify the gap based on measures of sentiment not meeting one or more thresholds in the policies;
determine an amount of positive sentiment in the data and negative sentiment in the data for each topic in a set of topics corresponding to aspects of an entity and selecting, by the computer, a topic from the set of topics corresponding to a particular aspect of the entity for the further processing based on determining that the amount of positive sentiment in the data and negative sentiment in the data for the selected topic fails to meet a threshold amount of positive and negative sentiment for the selected topic to derive sentiment for the particular aspect of the entity in response to analyzing the data and the analysis of sentiment to determine if the gap in the analysis of sentiment exists;
generate a task using a particular task template, in a set of task templates, matching a type of the gap to address the gap in the analysis of sentiment regarding the selected topic that failed to meet the threshold amount of positive and negative sentiment for the selected topic to derive sentiment for the particular aspect of the entity, wherein the task comprises a specification for performing the task comprising a description of activity, a domain ontology, a description of the gap, a description of the task, sentiment information, measures of sentiment about aspects of entities associated with the gap, questions for a survey from the task template, and instructions for completing the task to address the gap; and
use crowdsourcing to submit the task for processing to address the gap in the analysis of sentiment regarding the selected topic that failed to meet the threshold amount of positive and negative sentiment for the selected topic to derive sentiment for the particular aspect of the entity, wherein using the crowdsourcing to submit the task for processing further comprises the one or more processors further executing the program instructions to:
identify users associated with the topic about the particular aspect of the entity based on an amount of sentiment information about the topic in retrieved data from each user;
determine a group sentiment about the topic corresponding to a group of users on a social network; and
select one or more users within the group of users on the social network to submit the task to based on the determined group sentiment about the topic.

10. The computer system of claim 9, wherein the one or more processors further execute the program instructions to:
re-calculate the analysis of sentiment based on receiving a result of the processing of the task to address the gap in the analysis of sentiment regarding the selected topic that failed to meet the threshold amount of positive and negative sentiment for the selected topic to derive sentiment for the particular aspect of the entity; and
determine that the received result of the processing of the task closed the gap in the analysis of sentiment regarding the selected topic based on re-calculating of the analysis of sentiment in response to a policy in the policies that previously identified the gap no longer identifying the gap.

11. The computer system of claim 9, wherein analyzing of the sentiment is for the aspects of the entity corresponding to an activity, and wherein the gap in the analysis of sentiment requiring the further processing corresponds to the topic about the particular aspect of the entity.

12. The computer system of claim 11, wherein the one or more processors further execute the program instructions to:
identify the topic about the particular aspect of the entity based on sentiment information about the topic in the data.

13. The computer system of claim 12, wherein the program instructions executed by the one or more processors to identify the topic about the particular aspect of the entity based on sentiment information about the topic in the data are further executed by the one or more processors to:
   determine a quality of sentiment information in the data for each topic in the set of topics; and
   select the topic based on the quality of sentiment information for the topic not meeting a threshold for quality of sentiment information.

14. The computer system of claim 11, wherein the one or more processors further execute the program instructions to:
   identify the topic about the particular aspect of the entity based on an absence of information about the particular aspect of the entity in the data.

15. The computer system of claim 9, wherein the task comprises a specification for addressing the gap based on the particular task template corresponding to the type of gap of the gap.

16. The computer system of claim 11, wherein the one or more processors further execute the program instructions to:
   identify the aspects of the entity corresponding to the activity by using an ontology that describes entities and activities associated with the activity.

17. A computer program product for managing analysis of sentiment, the computer program product comprising a computer readable storage device having program instructions embodied therewith, the program instructions executable by a computer to cause the computer to perform a method comprising:
   retrieving, by the computer, data used to perform the analysis of sentiment;
   analyzing, by the computer, the data and the analysis of sentiment using user preferences comprising integration preferences for using social networks and crowdsourcing platforms and policies to determine if a gap in the analysis of sentiment exists requiring further processing to improve the analysis of sentiment, wherein the gap exists in sentiment analysis of source materials determined to be insufficient to derive sentiment for aspects of entities, and wherein gap identification uses the policies to identify the gap based on measures of sentiment not meeting one or more thresholds in the policies;
   responsive to the computer analyzing the data and the analysis of sentiment to determine if the gap in the analysis of sentiment exists, determining, by the computer, an amount of positive sentiment in the data and negative sentiment in the data for each topic in a set of topics corresponding to aspects of an entity and selecting, by the computer, a topic from the set of topics corresponding to a particular aspect of the entity for the further processing based on determining that the amount of positive sentiment in the data and negative sentiment in the data for the selected topic fails to meet a threshold amount of positive and negative sentiment for the selected topic to derive sentiment for the particular aspect of the entity;
   generating, by the computer, a task using a particular task template, in a set of task templates, matching a type of the gap to address the gap in the analysis of sentiment regarding the selected topic that failed to meet the threshold amount of positive and negative sentiment for the selected topic to derive sentiment for the particular aspect of the entity, wherein the task comprises a specification for performing the task comprising a description of activity, a domain ontology, a description of the gap, a description of the task, sentiment information, measures of sentiment about aspects of entities associated with the gap, questions for a survey from the task template, and instructions for completing the task to address the gap; and
   using, by the computer, crowdsourcing to submit the task for processing to address the gap in the analysis of sentiment regarding the selected topic that failed to meet the threshold amount of positive and negative sentiment for the selected topic to derive sentiment for the particular aspect of the entity, wherein the computer using the crowdsourcing to submit the task for processing further comprises:
      identifying, by the computer, users associated with the topic about the particular aspect of the entity based on an amount of sentiment information about the topic in retrieved data from each user;
      determining, by the computer, a group sentiment about the topic corresponding to a group of users on a social network; and
      selecting, by the computer, one or more users within the group of users on the social network to submit the task to based on the determined group sentiment about the topic.

18. The computer program product of claim 17, further comprising:
   re-calculating, by the computer, the analysis of sentiment based on receiving a result of the processing of the task to address the gap in the analysis of sentiment regarding the selected topic that failed to meet the threshold amount of positive and negative sentiment for the selected topic to derive sentiment for the particular aspect of the entity; and
   determining, by the computer, that the received result of the processing of the task closed the gap in the analysis of sentiment regarding the selected topic based on the re-calculating of the analysis of sentiment in response to a policy in the policies that previously identified the gap no longer identifying the gap.

19. The computer program product of claim 17, wherein the analyzing of the sentiment is for the aspects of the entity corresponding to an activity, and wherein the gap in the analysis of sentiment requiring the further processing corresponds to the topic about the particular aspect of the entity.

20. The computer program product of claim 19, and further comprising:
   identifying, by the computer, the topic about the particular aspect of the entity based on sentiment information about the topic in the data.

21. The computer program product of claim 19, wherein the task generated by the computer comprises a specification for addressing the gap based on the particular task template corresponding to the type of gap of the gap.

* * * * *